Patented Nov. 15, 1949

2,487,854

UNITED STATES PATENT OFFICE 2,487,854

DIPHENYLTRIHALOBUTANES

W E Craig, Philadelphia, and William F. Hester, Drexel Hill, Pa., assignors to Röhm & Haas Company, Philadelphia, Pa., a corporation of Delaware No Drawing. Application May 30, 1945, Serial No. 596,814

1 Claim. (Cl. 260—649)

This invention deals with compounds of the formula $$CH_3 \cdot CHX \cdot CX_2CH(Ar)_2$$

wherein X represents a halogen selected from chlorine and bromine and Ar represents an aromatic group of the benzene series. It further relates to insecticidal compositions containing a compound of the above formula and a carrier therefor.

These compounds may be prepared by reacting by condensing together a phenyl compound and an $\alpha,\alpha,\beta$-trihalobutyraldehyde, $CH_3CHXCX_2CHO$, in the presence of a strongly acidic agent such as concentrated sulfuric acid, aluminum chloride, boron trifluoride, liquid hydrogen fluoride, or tetraphosphoric acid. The amount of such condensing agent is desirably at least equal molecularly to the substituted aromatic compound and may desirably be used in excess. Sulfuric acid is the preferred catalyst, but other acidic catalysts are useful, there being some slight difference in these catalysts in respect to the relative proportions of the various isomers which may be obtained.

The phenyl compound used may contain one or more nuclear substituents, such as an alkyl, aryl, or cycloalkyl group, or an alkoxy, aryloxy, alkenyl, alkylamino, amino, acetamino, sulfonamido, acetyl, hydroxyl, thiol, carboxy, carboxyalkyl, chloro, bromo, or the like. Of these the relatively neutral substituents are preferred, that is, those substituents which do not result in distinctly acidic or distinctly basic phenyl compounds. Particularly desirable substituents are the ether, keto, and halogeno groups.

The trihalobutyraldehydes, available through known reactions, may contain chlorine or bromine or both of these halogens, as in $$CH_3CHClCCl_2CHO, \; CH_3CHBrCBr_2CHO,$$
$$CH_3CHBrCCl_2CHO, \; or \; CH_3CHClBr_2CHO$$

The reaction between trihalobutyraldehyde and substituted benzene may be performed at 0° to 75° C. over the course of an hour or more, the optimum temperature conditions depending upon the choice of catalyst and reactants. With sulfuric acid, temperatures from about 20° C. to about 50° C. are particularly useful.

The substituted benzene may be used in excess and thus serve as a solvent in the reaction, or a separate organic solvent may be employed, petroleum naphthas and chlorinated hydrocarbons being typical of suitable solvents. Solvents are particularly useful in connection with working up the reaction products. They assist in the separation and purification of the desired products, which may be washed free from condensing agent, neutralized, and further purified as desired, the solvents being stripped off, as a usual practice, in connection with the purification and isolation of the reaction products.

A typical preparation of a compound of this invention may be carried out according to the following directions. Into a mixture of 225 parts of sulfuric acid and 225 parts of chlorobenzene, there is added 175 parts of $\alpha,\alpha,\beta$-trichlorobutyraldehyde. The reaction mixture is stirred and maintained at about 35° to 45° C. for three hours. The product is taken up in ethylene dichloride. The solvent layer which forms is separated and washed with water and with a dilute solution of an alkaline agent, such as sodium carbonate. It is then concentrated by evaporation of the solvent, leaving an oily product which is suitable, as thus obtained, for use in insecticidal compositions.

Instead of chlorobenzene, as in the above example, there may be used methoxybenzene, ethoxybenzene, bromobenzene, acetophenone, toluene, methyl anisole, ethoxyethoxybenzene, chloroethoxybenzene, benzophenone, nitrobenzene, chloronitrobenzene, or other substituted benzene.

The insecticidal compositions prepared with the compounds of the formula $$CH_3CHXCX_2CH(Ar)_2$$

have good insecticidal activity against many types of insects without the marked toxicity against desirable types of living organisms, such as honey bees and predators, which are harmfully affected by certain other types of halogenated compounds. Nor are the compounds of this invention so toxic to warm-blooded animals as these latter compounds. Such differences in toxicity as well as the insecticidal action or value of compounds are beyond prediction.

In the preparation of insecticidal compositions, one or more of the compounds of this invention may be extended with a liquid or solid carrier therefor. In the case of liquid preparations designed for use as sprays in households or factories, the compound may be dissolved in a petroleum solvent, such as deodorized kerosene, with or without an auxiliary solvent, such as butoxyethoxyethanol, ethylene dichloride, or methyl hexyl ketone. For the preparation of sprays for agricultural or horticultural use, the compound may be dissolved in organic solvents, such as cyclohexanol, methyl ethyl ketone, pine oil, or a mixture of solvents, together with an emulsifying agent which permits dispersion of the insecticidal preparation in water. Sprays may also be prepared by taking up the compound with a finely divided solid, such as magnesium carbonate, gypsum, talc, pyrophyllite, silica, clay, or other acceptable carrier. Wetting agents, sticking agents, or dispersing agents may be used in such mixtures and/or sprays. The compound taken up with a finely divided solid may also be used as a dust. Furthermore, the compounds of this invention are suitable for use as the toxicants in preparations or compositions which are used as aerosols or "vapo-sprays," in which the toxicant may be used at a relatively high concentration. A high-boiling solvent, such as cyclohexanol, may be used together with a low-boiling liquid as a propellant, such as methyl chloride or dichlorodifluoromethane.

A typical composition suitable for use as a household spray may be prepared by dissolving five parts of 1,1-di(chlorophenyl)-2,2,3-trichlorobutane in ninety-five parts of deodorized kerosene. Such a composition tested according to the Peet-Grady procedure gives a knockdown of over 90% and a kill of +20 compared to O. T. I.

A composition consisting of three parts of the above compound and two parts of butoxyethoxyethyl thiocyanate in ninety-five parts of kerosene gives a knockdown of 100% and a kill of +20 to +30 compared to the O. T. I.

An insecticide prepared from two parts of 1,1-di(methoxyphenyl)-2,2,3-trichlorobutane dispersed in ninety-eight parts of talc effectively controls Mexican bean beetle larvae on bean plants without injury to the host plants.

A composition may be prepared by dissolving 1,1-di-(chlorophenyl)-2,2,3-trichlorobutane in acetone, taking up this solution on magnesium carbonate, and evaporating the solvent from the mixture. A small amount of diisobutylphenoxypolyethoxyethanol may be used in this mixture as a dispersant and wetting agent. This composition may be applied from aqueous sprays for the effective control of a great variety of insects, both chewing and sucking, such as southern army worms, cabbage worms, codling moth, potato beetles, etc.

We claim:

A compound of the formula $$CH_3CHCl \cdot CCl_2CH(C_6H_4Cl)_2$$

being the product prepared by reacting together between 20° C. and 50° C. in the presence of a strongly acidic condensing agent about two moles of chlorobenzene and about one mole of alpha, alpha, beta-trichlorobutyraldehyde.

W E CRAIG.
WILLIAM F. HESTER.

REFERENCES CITED

The following references are of record in the file of this patent:

UNITED STATES PATENTS

| Number | Name | Date |
| --- | --- | --- |
| 2,329,074 | Muller | Sept. 7, 1943 |

OTHER REFERENCES

Heppe, "Berichte" vol. 7, pg. 1420.
Elbs, "Journal for Prakt. Chem." vol. 47 (1893), pg. 68.
Beilstein, "Handbuch der Organischen Chemie," 4th edition, vol. 5, 1922, page 618.
Beilstein, "Handbuch der Organischen Chemie," 4th edition, vol. 1, 1918, page 664.
Fehling, "Neues Handwortenbuch der Chemie," 1875, vol. 2, page 810.
Martin et al., "Annual Report of the Agricultural & Horticultural Research Station, Long Ashton, Bristol, 1944," page 126.